United States Patent
Plantan et al.

(10) Patent No.: US 9,156,458 B2
(45) Date of Patent: Oct. 13, 2015

(54) BRAKING SYSTEM WITH NON-SPRING PARKING BRAKE ACTUATOR

(71) Applicant: Bendix Commercial Vehicle Systems LLC, Elyria, OH (US)

(72) Inventors: Ronald S. Plantan, Mooresville, NC (US); Charles E. Eberling, Wellington, OH (US); Fred W. Hoffman, Wakeman, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 211 days.

(21) Appl. No.: 13/961,022

(22) Filed: Aug. 7, 2013

(65) Prior Publication Data
US 2015/0041260 A1 Feb. 12, 2015

(51) Int. Cl.
*B60T 13/58* (2006.01)
*B60T 13/36* (2006.01)
*F16D 65/28* (2006.01)
*F16D 121/08* (2012.01)
*F16D 125/12* (2012.01)
*F16D 125/70* (2012.01)
*F16D 127/06* (2012.01)

(52) U.S. Cl.
CPC .............. *B60T 13/58* (2013.01); *B60T 13/36* (2013.01); *F16D 65/28* (2013.01); *F16D 2121/08* (2013.01); *F16D 2125/12* (2013.01); *F16D 2125/70* (2013.01); *F16D 2127/06* (2013.01)

(58) Field of Classification Search
CPC ...... F16F 2123/00; B60T 13/58; B60T 13/36; B60T 13/26; F16D 65/28; F16D 2127/06; F16D 2121/08; F16D 2125/12
USPC .................................. 188/106 F, 329; 303/13
See application file for complete search history.

(56) References Cited

U.S. PATENT DOCUMENTS

| 3,267,819 A | 8/1966 | Valentine et al. |
| 3,450,008 A | 6/1969 | Fites |
| 4,907,842 A | 3/1990 | Goldfein |

(Continued)

FOREIGN PATENT DOCUMENTS

| DE | 102005001234 A1 | 7/2006 |
| FR | 1168581 A | 12/1958 |

OTHER PUBLICATIONS

"Bendix DD-3 & SD-3 Safety Actuators," Bendix Commercial Vehicle Systems LLC, Service Data Sheet SD-02-4600 (Sep. 2007).
"Bendix EverSure Spring Brake with No Touch Technology," Bendix Commercial Vehicle Systems LLC, Service Data Sheet SD-02-4525 (Aug. 2011).
"Bendix R-12 & R-14 Relay Valves," Bendix Commercial Vehicle System LLC, Service Data Sheet SD-03-1064 (Mar. 2004).

(Continued)

*Primary Examiner* — Melanie Torres Williams
(74) *Attorney, Agent, or Firm* — Reising Ethington P.C.

(57) ABSTRACT

A braking system is provided that enables application and release of a parking brake with fluid control and that also maintains application of the brake during a loss of fluid pressure—all without using springs and using only a single fluid control conduit. The brake actuator for the system includes a housing defining service and parking chambers. A pushrod in the parking chamber is configured for movement with a diaphragm in the chamber. The parking brake is applied by introducing fluid on one side of the diaphragm. A clutch surrounds the pushrod and includes a tooth configured to engage corresponding teeth on the pushrod to hold the position of the pushrod even during a loss of fluid pressure. The clutch is rotated under fluid control to move the clutch tooth into and out of alignment with the teeth on the pushrod to hold and release the parking brake.

29 Claims, 3 Drawing Sheets

(56) References Cited

U.S. PATENT DOCUMENTS

| | | | |
|---|---|---|---|
| 5,036,961 A | | 8/1991 | Eberling et al. |
| 5,353,688 A | * | 10/1994 | Pierce et al. ............... 92/63 |
| 6,669,307 B1 | | 12/2003 | Vollmer |
| 6,851,761 B2 | | 2/2005 | Baumgartner et al. |
| 8,079,649 B2 | | 12/2011 | Eberling |
| 8,127,903 B2 | | 3/2012 | Scheckelhoff et al. |
| 2008/0202871 A1 | | 8/2008 | Battistella |
| 2012/0312645 A1 | | 12/2012 | Frashure et al. |
| 2013/0292216 A1 | * | 11/2013 | Bradford et al. .......... 188/106 F |

OTHER PUBLICATIONS

"Bendix R-12DC Relay Valve with Biased Double Check," Bendix Commercial Vehicle System LLC, Service Data Sheet SD-03-1068 (Mar. 2007).

"Bendix TR-2, TR-3 & TR-4 Inversion Valves," Bendix Commercial Vehicle System LLC, Service Data Sheet SD-03-4650 (Apr. 2004).

Communication Relating to the Results of the Partial International Search issued in corresponding international application PCT/US2014/049796 (Feb. 11, 2015).

* cited by examiner

BRAKING SYSTEM WITH NON-SPRING PARKING BRAKE ACTUATOR

BACKGROUND OF THE INVENTION a. Field of the Invention

This invention relates to a braking system for a vehicle. In particular, the invention relates to a braking system that enables application and release of a parking brake with fluid control and that also maintains application of the brake during a loss of fluid pressure—all without using spring applied braking and using only a single fluid control conduit.

b. Background Art

Conventional commercial vehicle braking systems typically include spring-actuated/fluid released parking brake actuators in which a mechanical spring actuates or applies the parking brake and pressurized fluid (typically pneumatic fluid) is used to release the brake. The parking brake remains released as long as fluid pressure is maintained in the parking brake actuator. The braking system typically has a common source of fluid pressure connected to actuators disposed at each wheel end of the of vehicle such that fluid pressure in a common control line simultaneously releases the parking brake for each wheel.

The use of spring-actuated/fluid released parking brake actuators has several drawbacks. An unintended loss of fluid pressure due to, for example, a leak or rupture in the fluid control system results in actuation of the parking brakes on each wheel. While this action is desirable—and even required in certain circumstances—to meet safety concerns, the action is undesirable in many other circumstances. For example, in military applications it is not uncommon for the fluid control system to become damaged as a result of damage to a single wheel from an improvised explosive device (IED). Actuation of the parking brakes in this circumstance immobilizes the vehicle and may trap the vehicle occupants in a hostile environment. In other applications, movement of the vehicle may be required because the immobilized vehicle is in a dangerous location (e.g., with high traffic volumes), is blocking the passage of other vehicles including potential emergency service vehicles, or is in a remote location far from potential repair facilities (e.g., a logging vehicle in a remote forest). The spring in the actuator is relatively heavy, highly stressed to produce the parking force and also tends to corrode and fatigue over time. The corrosion makes repair and replacement different. More importantly, because of the significant spring forces applied in the actuator, unexpected failure of the spring may result in significant injury to maintenance and other personnel. Finally, constant fluid pressure is required to maintain the parking brake in a release position.

In order to overcome some of the problems associated with spring-actuated/fluid released parking brake actuators, some actuators have been developed that use fluid pressure to actuate the parking brake. One example is the brake actuator previously offered for sale under the trademark DD-3 by the applicant Bendix Commercial Vehicle Systems LLC. For proper functioning of the parking brake, fluid actuated parking brake actuators must include means to maintain application of the parking brake despite any loss in fluid pressure. In the case of the DD-3 and similar brake actuators, a separate fluid control line has been used to actuate the locking mechanism. The requirement for an additional fluid control line, however, increases the number of parts, cost, and complexity of the braking system.

The inventors herein have recognized a need for a braking system that will minimize and/or eliminate one or more of the above-identified deficiencies.

BRIEF SUMMARY OF THE INVENTION

This invention relates to a braking system for a vehicle. In particular, the invention relates to a braking system that enables application and release of a parking brake with fluid control and that also maintains application of the brake during a loss of fluid pressure—all without using spring applied braking and using only a single fluid control conduit.

A braking system in accordance with one embodiment of the present invention includes a brake actuator and a fluid control system. The brake actuator includes a housing defining a service brake chamber and a parking brake chamber. The brake actuator further includes a service diaphragm disposed within the service brake chamber and a service pushrod disposed on a first side of the service diaphragm. Introduction of fluid on a second side of the service diaphragm urges the service pushrod away from a service release position towards a service apply position. The brake actuator further includes a parking diaphragm disposed within the parking brake chamber and having a first side facing the service diaphragm. Introduction of fluid on a second side of the parking diaphragm urging the service pushrod to the service apply position. The fluid control system includes a relay valve comprising a delivery port in fluid communication with the parking brake chamber of the brake actuator and first and second control ports. The fluid control system further includes a first inversion valve comprising a delivery port in fluid communication with the first control port of the relay valve, a supply port in fluid communication with a fluid control conduit, and a control port in fluid communication with the fluid control conduit. The fluid control system further includes a second inversion valve comprising a delivery port in fluid communication with the second control port of the relay valve, a supply port, and a control port. The fluid control system further includes a third inversion valve comprising a delivery port in fluid communication with the supply port of the second inversion valve and the control port of the second inversion valve, a supply port in fluid communication with a fluid source and a control port in fluid communication with the fluid control conduit. A decrease in fluid pressure in the fluid control conduit enables delivery of fluid from the fluid source to the parking brake chamber and an increase in fluid pressure in the fluid control conduit enables exhaustion of fluid from the parking brake chamber.

A brake actuator for use in braking system in accordance with one embodiment of the present invention includes a housing defining a service brake chamber and a parking brake chamber. The actuator further includes a service diaphragm disposed within the service brake chamber and a service pushrod disposed on a first side of the service diaphragm. The actuator further includes a parking diaphragm disposed within the parking brake chamber and a parking pushrod extending through the parking diaphragm. The parking pushrod has a first end disposed on a first side of the parking diaphragm and extending into the service brake chamber and disposed on a second side of the service diaphragm. The parking pushrod also defines a plurality of teeth. The actuator further includes a spring disposed within the service brake chamber on the first side of the service diaphragm. The spring biases the service pushrod to a service release position and the parking pushrod to a parking release position. The actuator further includes a clutch disposed about the parking pushrod and defining a clutch tooth on a radially inner surface and configured for intermittent engagement with the plurality of teeth of the parking pushrod and a clutch actuator configured to control rotation of the clutch. Introduction of fluid on the second side of the service diaphragm urges the service pushrod away from the service release position towards a service apply position. Introduction of fluid on a second side of the parking diaphragm urges the parking pushrod away from the parking release position towards a parking apply position and the service pushrod away from the service release position towards the service apply position.

A brake actuator for use in braking system in accordance with another embodiment of the present invention includes a housing defining a service brake chamber and a parking brake chamber. The actuator further includes a service diaphragm disposed within the service brake chamber and a service pushrod disposed on a first side of the service diaphragm. The actuator further includes a parking diaphragm disposed within the parking brake chamber and a parking pushrod extending through the parking diaphragm. The parking pushrod has a first end disposed on a first side of the parking diaphragm and extending into the service brake chamber and disposed on a second side of the service diaphragm. The actuator further includes a spring disposed within the service brake chamber on the first side of the service diaphragm. The spring biases the service pushrod to a service release position and the parking pushrod to a parking release position. The actuator further includes means for holding the parking pushrod in a parking apply position. Introduction of fluid on the second side of the service diaphragm urges the service pushrod away from the service release position towards a service apply position. Introduction of fluid on a second side of the parking diaphragm urges the parking pushrod away from the parking release position towards the parking apply position and the service pushrod away from the service release position towards the service apply position.

A fluid control system for a brake actuator for use in braking system in accordance with one embodiment of the present invention includes a relay valve comprising a delivery port in fluid communication with a parking brake chamber of the brake actuator and first and second control ports. The fluid control system further includes a first inversion valve comprising a delivery port in fluid communication with the first control port of the relay valve, a supply port in fluid communication with a fluid control conduit and a control port in fluid communication with the fluid control conduit. The fluid control system further includes a second inversion valve comprising a delivery port in fluid communication with the second control port of the relay valve, a supply port and a control port. The fluid control system further includes a third inversion valve comprising a delivery port in fluid communication with the supply port of the second inversion valve and the control port of the second inversion valve, a supply port in fluid communication with a fluid source; and, a control port in fluid communication with the fluid control conduit. A decrease in fluid pressure in the fluid control conduit enables delivery of fluid from the fluid source to the parking brake chamber. An increase in fluid pressure in the fluid control conduit enables exhaustion of fluid from the parking brake chamber.

A braking system in accordance with the present invention represents an improvement relative to conventional braking systems. The inventive braking system enables application of the parking brake using fluid control and can also maintain application of the brake during a loss of fluid pressure without using mechanical springs. As a result, the weight of the actuator is reduced, repair and replacement of the parking brake actuator is easier and safer than conventional spring-actuated parking brake actuators, and a constant fluid pressure is not required to maintain the actuator in a released state. The inventive braking system also permits selective release of the parking brake despite a leak or rupture in the fluid control system of the type that would result in actuation and locking of spring-actuated parking brake actuators. As a result, the vehicle is not immobilized and the vehicle and its occupants can be moved, if necessary, to a safer or more accessible location and/or out of the way of other vehicles. The inventive braking system also achieves the above benefits while using a conventional two-line fluid control system (i.e., one fluid control line to the service brake chamber and another fluid control line to the parking brake chamber)—unlike conventional fluid-actuated parking brake actuators that require a separate fluid control line to maintain the position of the parking brake actuator.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
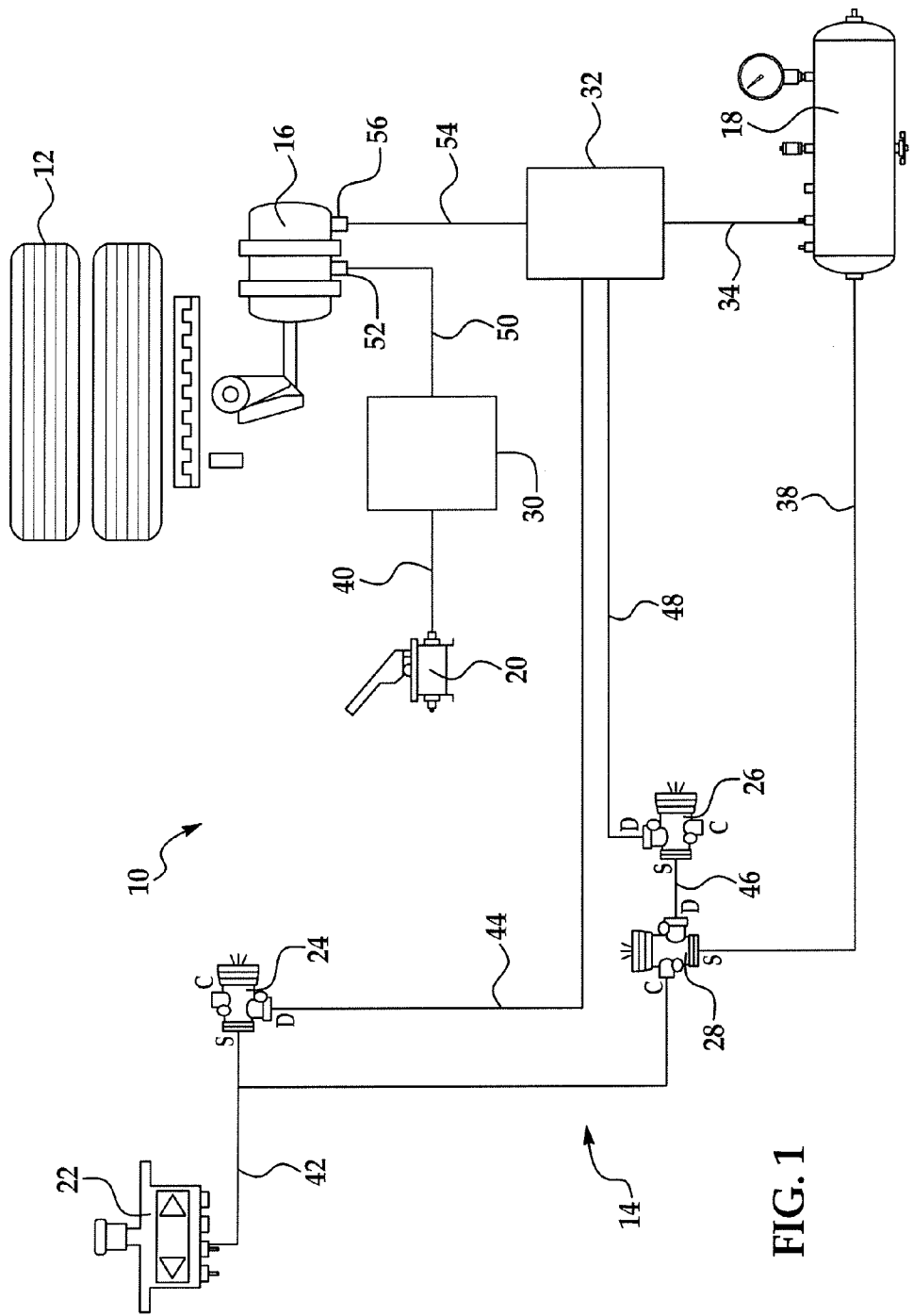
FIG. 1 is a diagrammatic view of a braking system in accordance with one embodiment of the present invention.

Referring now to the drawings wherein like reference numerals are used to identify identical components in the various views, FIG. 1 illustrates a braking system 10 in accordance with one embodiment of the present invention. System 10 is provided to control actuation and release of foundation brakes (not shown) applied to one or more vehicle wheels 12. The brakes may comprise, for example, conventional drum brakes in which one or more brakes shoes are configured to engage and disengage a braking surface in a drum upon actuation and release of the brakes. In addition to conventional vehicle brakes, system 10 may include a fluid control system 14 and one or more brake actuators 16. System 10 is configured for use with commercial vehicles including trucks and buses. It should be understood, however, that system 10 can be configured for use with a variety of vehicles.

Fluid control system 14 is provided to control distribution of fluid within system 10 and delivery of fluid to and venting of fluid from actuators 16. Fluid control system 14 may include a fluid source 18 and one or more control valves 20, 22, 24, 26, 28, 30, 32 controlling distribution of fluid through system 10.

Fluid source 18 is conventional in the art any may comprise a fluid reservoir or tank for storing pressurized fluid. A compressor (not shown) operated by the vehicle engine may be used for charging the tank with fluid pressure and one or more check valves (not shown) may be used to prevent loss of pressure from the tank in the event of an upstream or downstream pressure loss. In the illustrated embodiment the fluid comprises pneumatic fluid. Fluid source 18 is coupled to one end of a conduit 34 extending between fluid source 18 and valve 32 and at one end of a conduit 38 extending between fluid source 18 and valve 28.

Valve 20 comprises a conventional foot control pedal valve for use in actuating and releasing the service brake. When the pedal is depressed, the valve 20 opens to allow pressurized fluid to flow from a fluid source (not shown) through valve 20 to a control port on relay valve 30. The increase in fluid pressure at the control port on valve 30 causes fluid pressure to flow from a fluid source (not shown) through supply and delivery ports on valve 30 to actuator 16 in order the actuate the service brake. When the pedal is released, valves 20 and 30 close and fluid pressure is exhausted to release the service brake. Valve 20 is coupled at one end of conduit 40 extending between valve 20 and valve 30.

Valve 22 comprises a control valve for use in actuating and releasing the parking brake. Valve 22 may be mounted on the dashboard in a truck cab and may comprise a manually operable push-pull button valve. Valve 22 may include a supply port through which fluid enters valve 22 and a delivery port through which fluid exits valve 22. Valve 22 is coupled at one end of conduit 42 extending between valve 22 and valves 24, 28. Manually pulling the button on valve 22 exhausts fluid from conduit 42 to actuate the parking brake as described in greater detail below. Manually pressing the button causes delivery of fluid pressure from a fluid source (not shown) through valve 22 and conduit 42 to release the parking brake as described in greater detail below.

Valves 24, 26, 28, comprise inversion valves (i.e. valves that deliver fluid pressure in the absence of fluid pressure at a control port of the valve). Valves 24, 26, 28, may comprise the inversion valve offered for sale under the trademark "TR-3" by the applicant Bendix Commercial Vehicle Systems LLC. Valves 24, 26, 28 each include a supply port S, a delivery port D, a control port C and an exhaust port. In valves 24, 26, however, control port C is plugged and an internal passage connects the supply port S and control port C. The supply port S of valve 24 is coupled to one end of fluid conduit 42 extending between valve 22 and valve 24 while the delivery port D of valve 24 is coupled to one end of a fluid conduit 44 extending between valve 24 and valve 32. The supply port S of valve 26 is coupled to one end of a conduit 46 extending between valve 26 and the delivery port D of valve 28 while the delivery port D of valve 26 is coupled to one end of a conduit 48 extending between valve 26 and valve 32. The supply port S of valve 28 is coupled to one end of conduit 38 extending between fluid source 18 and valve 28. The delivery port D of valve 28 is coupled to one end of a conduit 46 extending between valve 28 and the supply port S of valve 26. Finally, the control port C of valve 28 is coupled to one end of the conduit 42 extending between control valve 22 and valve 28.

Valves 30, 32 comprise relay valves. Valves 30, 32 are provided to increase the speed of application and release of the brakes and are conventional in the art. Valves 30, 32 may comprise the relay valve offered for sale under the trademark "R-12DC" by the applicant Bendix Commercial Vehicle Systems LLC. Valve 30 has a supply port coupled to a service brake fluid source (not shown), and a delivery port coupled to one end of a conduit 50 extending between valve 30 and a service port 52 on actuator 16. Valve 30 also has a control port coupled to one end of conduit 40 extending between valve 20 and valve 30. Valve 32 has a supply port coupled to one end of conduit 34 extending between fluid source 18 and valve 32 and a delivery port coupled to one end of a conduit 54 extending between valve 32 and a parking port 56 on actuator 16. Valve 32 also has one control port coupled to one end of conduit 44 extending between valve 24 and valve 32 and another control port coupled to one end of conduit 48 extending between valve 26 and valve 32.

As illustrated in FIG. 1, the fluid control system 14 of system 10 is configured to control actuation of the brakes associated with the wheels of a tractor in a tractor-trailer vehicle. It should be understood, however, that system 10 can be substantially replicated for use in controlling actuation of the brakes associated with the wheels of the trailer. In particular, a trailer may have a fluid source 18, valves 24, 26, 28, 30, 32 and associated fluid conduits arranged substantially similar to the arrangement on the tractor and fluid conduits extending from control valves 20, 22 can be coupled to corresponding conduits on the trailer through a conventional glad hand connection.

Figure 2:
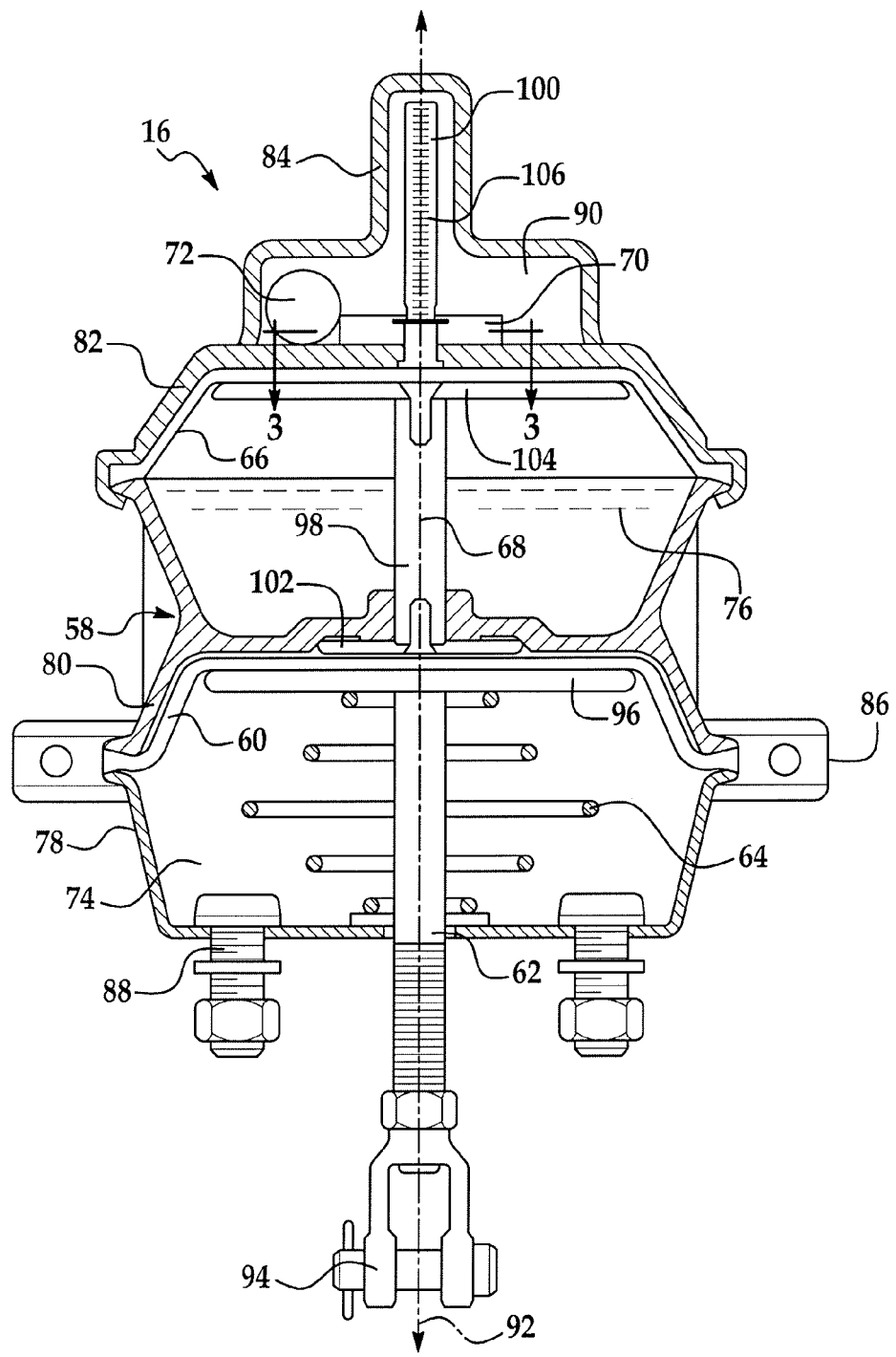
FIG. 2 is a cross-sectional view of one embodiment of a brake actuator for use in the braking system of FIG. 1.

Referring now to FIG. 2, actuator 16 is provided to control actuation and release of the brakes associated with the vehicle wheels 12. Actuator 16 may include a housing 58, a service diaphragm 60, a service pushrod 62 movable between a service release position (shown in FIG. 2) and service apply position, a spring 64, a parking diaphragm 66, a parking pushrod 68 movable between a parking release position (shown in FIG. 2) and a parking apply position, means for holding the parking pushrod 68 in the parking apply position such as clutch 70 and means, such as clutch actuator 72, for rotating clutch 70.

Housing 58 provides structural support for the other components of actuator 16 and protects those components from foreign objects and elements. Housing 58 further defines a service brake chamber 74 and a parking brake chamber 76. Housing 58 may include multiple housing members 78, 80, 82, 84. Members 78, 80 define service brake chamber 74 and receive service diaphragm 60 therebetween. Members 78, 80, may be held in place by a conventional clamp 86 disposed about the circumference of housing 58. Members 78, 80 defines aligned central apertures through which service pushrod 62. Member 78 also defines surrounding apertures through which mounting bolts 88 may extend for mounting actuator 16 within the vehicle. Conventional nuts and washers may be disposed about bolts 88 to securely fasten actuator 16 to the vehicle. Members 80, 82 define parking brake chamber 76 and receive parking diaphragm 66 therebetween. Members 80, 82 may be held in place by crimping one or both of members 80, 82 or through the use of a clamp as described above or other conventional fasteners. Members 80, 82 define aligned central apertures through which parking pushrod 68 may extend. Members 82, 84 further defines a chamber 90 configured to receive clutch 70 and clutch actuator 72.

Service diaphragm 60 is provided to urge service pushrod 62 outward from actuator 16 in response to fluid pressure in order to cause application of the vehicle brakes. Diaphragm 60 is conventional in the art. Diaphragm 60 is disposed within chamber 74 and may be held between members 78, 80 of housing 58. Fluid pressure may be introduced to service chamber 74 on one side of diaphragm 60 opposite the side on which service pushrod 62 is disposed through service port 52 via fluid conduit 50 (see FIG. 1). Introduction of fluid pressure to chamber 74 urges service pushrod 62 to a service apply position.

Service pushrod 62 transfers forces generated in actuator 16 to the vehicle brakes in order to apply or release the brakes. Pushrod 62 is disposed about and moves along a longitudinal axis 92. Pushrod 62 may define a yoke 94 at one end of the pushrod 62 disposed outside of housing 58. In a conventional drum brake, for example, the yoke 94 may be coupled to a slack adjuster (not shown) that is disposed about a camshaft (not shown) and translates linear movement of the service pushrod 62 into rotational movement of the camshaft and a cam (not shown) mounted on one end of the camshaft. Rotation of the cam then causes corresponding movement of brakes shoes into and out of engagement with a braking surface in a drum. Pushrod 62 may define a pressure plate 96 at an opposite end from yoke 94. Plate 96 provides a surface on one side configured to engage diaphragm 60 and a surface on the opposite side configured to act as a spring seat for spring 64.

Spring 64 is provided to bias service pushrod 62 to a service release position and parking pushrod 68 to a parking release position. Spring 64 is conventional in the art and is disposed within service brake chamber 74 on one side of service diaphragm 60. Spring 64 is disposed about service pushrod 62 and is seated between member 78 of housing 58 and pressure plate 94 of pushrod 62.

Parking diaphragm 66 is provided to urge parking pushrod 68 in one direction along axis 92 away from the parking release position and towards the parking apply position in response to fluid pressure in order to cause application of the vehicle brakes. Diaphragm 66 is conventional in the art. Diaphragm 66 is disposed within chamber 76 and may be held between members 80, 82 of housing 58. Fluid pressure may be introduced to parking brake chamber 76 on one side of diaphragm 66 through a parking port 56 via fluid conduit 54 (see FIG. 1). Introduction of fluid pressure urges parking pushrod 68 to a parking apply position.

Figure 3:
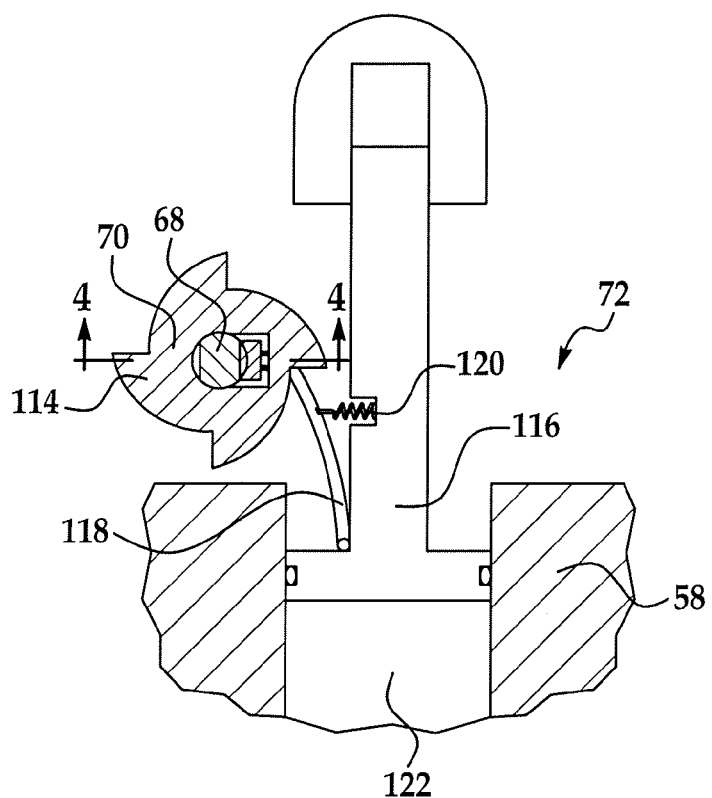
FIG. 3 is a cross-sectional view of a portion of the brake actuator of FIG. 2 taken along lines 3-3 in FIG. 2.
Figure 4:
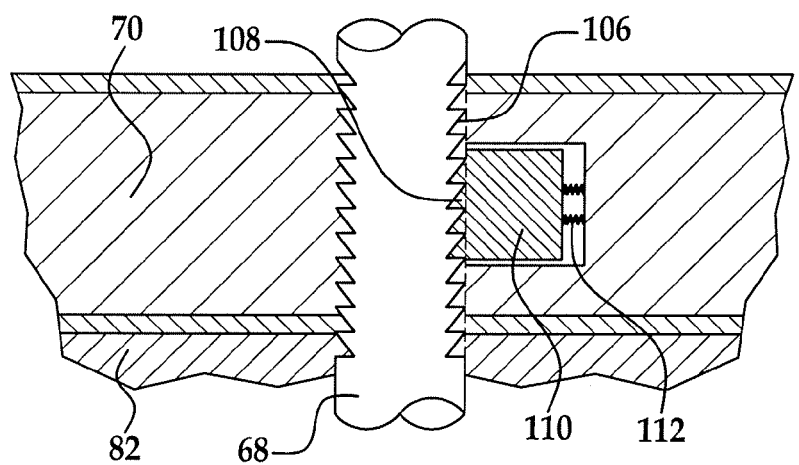
FIG. 4 is a cross-sectional view of a portion of the brake actuator of FIG. 2 taken along 4-4 in FIG. 3.

Parking pushrod 68 is provided to cause movement of service diaphragm 60 and service pushrod 62 in response to the introduction of fluid pressure in parking brake chamber 76 in order to apply or release the brakes. Pushrod 68 is disposed about and moves along axis 92 and may be axially aligned with pushrod 62. Pushrod 68 extends through parking diaphragm 66 and is configured for movement with parking diaphragm 66. Pushrod 68 may comprise multiple members 98, 100 generally disposed on opposite sides of diaphragm 66. Member 98 of pushrod 68 is disposed on one side of diaphragm 66 and extends into service brake chamber 74. Member 98 defines a pressure plate 102 at one longitudinal end of pushrod 68 configured for selective engagement with one side of service diaphragm 60. Pushrod 68 further defines another pressure plate 104 intermediate the longitudinal ends of pushrod 68. Plate 104 is disposed on one side of parking diaphragm 66. Introduction of fluid pressure on the opposite side of diaphragm 66 urges pushrod 68 to a parking apply position and therefore urges service pushrod 62 to the service apply position via the force exerted on service diaphragm 60 by plate 102 of parking pushrod 68. In accordance with one aspect of the present invention, member 100 of parking pushrod 68 may define a plurality of teeth 106 for a purpose described below. Referring to FIGS. 2-4, in one embodiment, two sets of teeth 106 may be arranged in separate longitudinally extending rows on pushrod 68. Each row of teeth 106 extends over only a circumferential portion of the outer circumferential surface of the pushrod 68. Referring to FIG. 3, the two rows of teeth 106 may be diametrically opposite one another and the circumferential portions of the outer circumferential surface of pushrod 68 between the rows of teeth 106 may be untoothed or smooth.

Clutch 70 is provided to hold parking pushrod 68 in the parking apply position. Clutch 70 is annular in construction and is disposed within chamber 90 about pushrod 68. Clutch 70 is a one-way or ratchet clutch. Referring to FIGS. 3-4, clutch 70 defines at least one or more clutch teeth 108 on a radially inner surface of the clutch 70. Teeth 108 may formed in an axially extending row along the radially inner surface of clutch 70. Teeth 108 may also be formed on a pawl 110 that is disposed in a recess in the radially inner surface of clutch 70 and that is biased radially inwardly towards pushrod 68 by one or more springs 112. The clutch teeth 108 have a profile such that, during alignment of clutch teeth 108 and teeth 106 on parking pushrod 68, movement of parking pushrod 68 is permitted in one direction along axis 92 away from the parking release position and towards the parking apply position (i.e. downward in FIG. 2) and movement of the parking pushrod 68 is inhibited in an opposite direction along axis 92 away from parking apply position and towards the parking release position (i.e. upward in FIG. 2). As a result, fluid pressure introduced into parking brake chamber 76 will result in movement of pushrod 68 to the parking apply position and, thereafter, clutch 70 will prevent release of the parking brake (until directed as discussed below) even in the event of a loss of fluid pressure in parking brake chamber 76. Referring to FIG. 3, clutch 70 also defines a plurality of ratchet teeth 114 on a radially outer surface of clutch 70. In the illustrated embodiment clutch 70 defines four ratchet teeth that are equally circumferentially spaced about clutch 70 (i.e. every ninety degrees). Ratchet teeth 70 have a profile defining a relatively gradual slope on one side and a relatively steep slope on another side for a purpose discussed hereinbelow.

Clutch actuator 72 is provided to control rotation of clutch 70 about pushrod 68. In accordance with one embodiment of the invention, clutch 70 is rotated in ninety degree increments such that the teeth 108 on clutch 70 are moved into and out of engagement with rows of teeth 106 on pushrod 68. As a result, when pushrod 68 is in the parking apply position, the next rotation of clutch 70 disengages teeth 108 from teeth 106 on pushrod 68 and allows pushrod 68 to move to the parking release position under the force of spring 64 in service chamber 74. The next rotation of clutch 70 would then occur during actuation of the parking brake (as discussed below) and cause reengagement of teeth 108 with another row of teeth 106 on pushrod 68 to hold pushrod 68 in the parking apply position. Actuator 72 may include a piston 116, a pawl 118 and a spring 120.

One end of piston 116 is disposed within a fluid chamber 122 formed in housing 58. Fluid pressure within chamber 122 urges piston 120 in one direction (upward in FIG. 3). A spring (not shown) may bias piston 120 in the opposite direction (downward in FIG. 3). Piston 116 defines mounting surfaces for pawl 118 and spring 120.

Pawl 118 transfers force from movement of piston 116 to clutch 70 in order to cause rotation of clutch 70. Pawl 118 has one end pivotally mounted on piston 116. The opposite, or free, end of pawl 118 is biased away from piston 116 by spring 120 and is configured to engage one of ratchet teeth 114 on clutch 70 and, in particular, the side of a tooth 114 having a relatively steep slope. Movement of piston 116 in response to fluid pressure is transferred to clutch 70 through the engagement of pawl 118 with a corresponding ratchet tooth 114 of clutch 70. Because of the profile of ratchet teeth 114, the illustrated clutch 70 rotates ninety degrees in order to align clutch teeth 108 on clutch 70 with either teeth 106 on pushrod 68 (when the parking brake is applied) or an untoothed portion of pushrod 68 (when the parking brake is released). Once fluid pressure in chamber 112 is removed, a spring (not shown) returns piston 116 to its original position and pawl 118 slides over the next ratchet tooth 104—in particular, the side of the tooth 104 having a relatively gradual slope—to reposition pawl 118 for the next desired rotation of clutch 70.

Referring to FIGS. 1-2, the operation of braking system 10 will now be described in greater detail. Actuation of the service brake is accomplished by depressing foot pedal valve 20. This action causes relay valve 30 to direct fluid from a fluid source (not shown) to service port 52 of actuator 16 and into service brake chamber 74 on one side of diaphragm 60. Fluid pressure in chamber 74 urges diaphragm 60 and service pushrod 62 to a service apply position against the force of spring 64 to apply the vehicle brakes. When the pedal is released, valve 20 closes and fluid pressure is exhausted from chamber 74. Spring 64 urges pushrod 62 to the service release position to release the brake.

When the vehicle operator wishes to actuate the parking brake, the operator may pull the button on control valve 22 to exhaust fluid conduit 42. The loss in fluid pressure in conduit 42 allows fluid pressure from conduit 42 to flow from supply port S of valve 28 to delivery port D of valve 28 and through conduit 46 to the supply S and control ports C of valve 26. Fluid from supply port S of valve 26 flows outward from delivery port D of valve 26 to a predetermined pressure into conduit 48 to a control port of valve 32. This action causes delivery of fluid from fluid source 20 through valve 32 and conduit 54 to parking port 56 of actuator 16 and into parking brake chamber 76 of actuator 16 on one side of parking diaphragm 66. Fluid pressure in chamber 76 parking pushrod 68 to the parking apply position and, consequently, service pushrod 62 to the service apply position against the force of spring 64 in order to apply the vehicle brakes. Fluid is also delivered through conduit 54 to fluid chamber 122 resulting in rotation of clutch 70 such that the clutch teeth 108 on clutch 70 are aligned with teeth 106 on pushrod 68. As a result, while pushrod 68 is able to move to the parking apply position freely, pushrod 68 is temporarily prevented from returning to the parking release position. Once the fluid pressure in chamber 76 reaches a predetermined level, valve 26 closes and the remaining fluid pressure in conduits 48, 54 is exhausted. Pressure is also vented from parking brake chamber 76. Because clutch 70 retains the position of parking pushrod 68, constant fluid pressure is not required for continued application of the parking brake. Further, the inventive braking system allows variation in the applied parking brake force without varying the size of the parking brake chamber. Rather, valve 26 can be adjusted to control the predetermined pressure at which further delivery of fluid is stopped.

When the vehicle operator wants to release the parking brake, the operator pushes in the control button on control valve 22 which increases fluid pressure in conduit 42. Because valve 24 is open (due to the prior absence of fluid pressure in conduit 42), fluid from conduit 42 initially flows through supply port S on valve 24 to delivery port D on valve 24 and into conduit 44. Fluid flow into conduit 44 occurs until a predetermined fluid pressure is reached and valve 24 closes and exhausts to atmosphere. Fluid in conduit 44 is delivered to a control port of valve 32. This action causes delivery of fluid from fluid source 20 through valve 32 and conduit 54 to parking port 56 and into parking brake chamber 76 of actuator 16 and also into fluid chamber 122 thereby causing rotation of clutch 70 such that clutch teeth 108 on clutch 70 are no longer aligned with the teeth 106 on pushrod 68. Once the predetermined pressure is reached, valves 24, 32 close and conduits 44, 54 (and parking brake chamber 76) are vented. Because the clutch teeth 108 on clutch 70 are no longer aligned with the teeth 106 on pushrod 68, spring 64 urges parking pushrod 68 to the parking release position (and service pushrod 62 to the service release position) to release the parking brake.

A braking system 10 in accordance with the present invention represents an improvement relative to conventional braking systems. The inventive braking system 10 enables application of the parking brake using fluid control rather than mechanical springs and can also maintain application of the parking brake during a loss of fluid pressure. As a result, the weight of the actuator is reduced, repair and replacement of the parking brake actuator is easier and safer than conventional spring-actuated parking brake actuators, and a constant fluid pressure is not required to maintain the actuator in a released state. A diaphragm is more durable than a parking spring which equates to longer life. The inventive braking system also permits selective release of the parking brake despite a leak or rupture in the fluid control system of the type that would result in actuation and locking of spring-actuated parking brake actuators. As a result, the vehicle is not immobilized and the vehicle and its occupants can be moved, if necessary, to a safer or more accessible location and/or out of the way of other vehicles. The inventive braking system also achieves the above benefits while using a conventional two-line fluid control system (i.e., one fluid control line to the service brake chamber and another fluid control line to the parking brake chamber)—unlike conventional fluid-actuated parking brake actuators that require a separate fluid control line to maintain the position of the parking brake actuator.

While the invention has been shown and described with reference to one or more particular embodiments thereof, it will be understood by those of skill in the art that various changes and modifications can be made without departing from the spirit and scope of the invention.

What is claimed is:

1. A brake actuator, comprising:
    a housing defining a service brake chamber and a parking brake chamber;
    a service diaphragm disposed within said service brake chamber;
    a service pushrod disposed on a first side of said service diaphragm
    a parking diaphragm disposed within said parking brake chamber;
    a parking pushrod extending through said parking diaphragm, said parking pushrod having a first end disposed on a first side of said parking diaphragm and extending into said service brake chamber and disposed on a second side of said service diaphragm, said parking pushrod defining a first plurality of teeth;
    a spring disposed within said service brake chamber on said first side of said service diaphragm and biasing said service pushrod to a service release position and said parking pushrod to a parking release position;
    a clutch disposed about said parking pushrod and defining a clutch tooth on a radially inner surface configured for intermittent engagement with said first plurality of teeth of said parking pushrod; and
    a clutch actuator configured to control rotation of said clutch
    wherein introduction of fluid on said second side of said service diaphragm urges said service pushrod away from said service release position towards a service apply position, introduction of fluid on a second side of said parking diaphragm urges said parking pushrod away from said parking release position towards a parking apply position and said service pushrod away from said service release position towards said service apply position.

2. The brake actuator of claim 1 wherein rotation of said clutch moves said clutch tooth into and out of alignment with said first plurality of teeth on said parking pushrod and said clutch tooth has a profile such that, during alignment of said clutch tooth and said first plurality of teeth on said parking pushrod, movement of said parking pushrod is permitted in a first direction along a longitudinal axis of said parking pushrod away from said parking release position and towards said parking apply position and movement of said parking pushrod is inhibited in a second direction along said longitudinal axis opposite said first direction away from said parking apply position and towards said parking release position.

3. The brake actuator of claim 2 wherein introduction of fluid on said second side of said parking diaphragm and rotation of said clutch occurs simultaneously.

4. The brake actuator of claim 1 wherein said clutch defines a plurality of ratchet teeth on a radially outer surface and wherein said clutch actuator comprises:
   a piston;
   a pawl having a first end pivotally supported on said piston and a second end configured for engagement with one of said ratchet teeth on said clutch; and,
   a spring biasing said second end of said pawl towards said clutch.

5. The brake actuator of claim 4 wherein said clutch defines four ratchet teeth equally circumferentially spaced about said clutch.

6. The brake actuator of claim 1 wherein said first plurality of teeth on said parking pushrod are arranged in a first longitudinally extending row that extends over a first circumferential portion of an outer surface of said parking pushrod.

7. The brake actuator of claim 6 wherein said parking pushrod includes a second plurality of teeth arranged in a second longitudinally extending row that extends over a second circumferential portion of said outer surface of said parking pushrod.

8. The brake actuator of claim 7 wherein a third circumferential portion of said outer surface of said parking pushrod between said first and second circumferential portions is untoothed.

9. The brake actuator of claim 7 wherein said first and second circumferential portions of said outer surface of said parking pushrod are diametrically opposite one another.

10. A brake actuator, comprising: a housing defining a service brake chamber and a parking brake chamber; a service diaphragm disposed within said service brake chamber; a service pushrod disposed on a first side of said service diaphragm a parking diaphragm disposed within said parking brake chamber; a parking pushrod extending through said parking diaphragm, said parking pushrod having a first end disposed on a first side of said parking diaphragm and extending into said service brake chamber and disposed on a second side of said service diaphragm; a spring disposed within said service brake chamber on said first side of said service diaphragm and biasing said service pushrod to a service release position and said parking pushrod to a parking release position; means for holding said parking pushrod in a parking apply position wherein introduction of fluid on said second side of said service diaphragm urges said service pushrod away from said service release position towards a service apply position, introduction of fluid on a second side of said parking diaphragm urges said parking pushrod away from said parking release position towards said parking apply position and said service pushrod away from said service release position towards said service apply position wherein said holding means comprises a clutch disposed about said parking pushrod and defining a clutch tooth on a radially inner surface; and means for rotating said clutch wherein rotation of said clutch moves said clutch tooth into and out of alignment with a first plurality of teeth on said parking pushrod and said clutch tooth has a profile such that, during alignment of said clutch tooth and said first plurality of teeth on said parking pushrod, movement of said parking pushrod is permitted in a first direction along a longitudinal axis of said parking pushrod away from said parking release position and towards said parking apply position and movement of said parking pushrod is inhibited in a second direction along said longitudinal axis opposite said first direction away from said parking apply position and towards said parking release position.

11. The brake actuator of claim 10 wherein introduction of fluid on said second side of said parking diaphragm and rotation of said clutch occurs simultaneously.

12. The brake actuator of claim 10 wherein said clutch defines a plurality of ratchet teeth on a radially outer surface and wherein said rotating means comprises:
   a piston;
   a pawl having a first end pivotally supported on said piston and a second end configured for engagement with one of said ratchet teeth on said clutch; and,
   a spring biasing said second end of said pawl towards said clutch.

13. The brake actuator of claim 12 wherein said clutch defines four ratchet teeth equally circumferentially spaced about said clutch.

14. The brake actuator of claim 10 wherein said first plurality of teeth on said parking pushrod are arranged in a first longitudinally extending row that extends over a first circumferential portion of an outer surface of said parking pushrod.

15. The brake actuator of claim 14 wherein said parking pushrod includes a second plurality of teeth arranged in a second longitudinally extending row that extends over a second circumferential portion of said outer surface of said parking pushrod.

16. The brake actuator of claim 15 wherein a third circumferential portion of said outer surface of said parking pushrod between said first and second circumferential portions is untoothed.

17. The brake actuator of claim 15 wherein said first and second circumferential portions of said outer surface of said parking pushrod are diametrically opposite one another.

18. A fluid control system for a brake actuator, comprising:
   a relay valve comprising
      a delivery port in fluid communication with a parking brake chamber of the brake actuator; and
      first and second control ports;
   a first inversion valve comprising
      a delivery port in fluid communication with said first control port of said relay valve;
      a supply port in fluid communication with a fluid control conduit; and
      a control port in fluid communication with said fluid control conduit;
   a second inversion valve comprising
      a delivery port in fluid communication with said second control port of said relay valve;
      a supply port; and
      a control port;
   a third inversion valve comprising
      a delivery port in fluid communication with said supply port of said second inversion valve and said control port of said second inversion valve;
      a supply port in fluid communication with a fluid source; and,
      a control port in fluid communication with said fluid control conduit
   wherein a decrease in fluid pressure in said fluid control conduit enables delivery of fluid from said fluid source to said parking brake chamber and an increase in fluid pressure in said fluid control conduit enables exhaustion of fluid from said parking brake chamber.

19. The fluid control system of claim 18 wherein said relay valve, said first inversion valve, said second inversion valve and said third inversion valve are disposed in a common housing.

20. A braking system, comprising:
   a brake actuator comprising
      a housing defining a service brake chamber and a parking brake chamber;

a service diaphragm disposed within said service brake chamber;

a service pushrod disposed on a first side of said service diaphragm, introduction of fluid on a second side of said service diaphragm urging said service pushrod away from a service release position towards a service apply position;

a parking diaphragm disposed within said parking brake chamber and having a first side facing said service diaphragm, introduction of fluid on a second side of said parking diaphragm urging said service pushrod to said service apply position; and, a fluid control system comprising a relay valve comprising a delivery port in fluid communication with said parking brake chamber of the brake actuator; and first and second control ports;

a first inversion valve comprising a delivery port in fluid communication with said first control port of said relay valve;

a supply port in fluid communication with a fluid control conduit; and a control port in fluid communication with said fluid control conduit;

a second inversion valve comprising a delivery port in fluid communication with said second control port of said relay valve;

a supply port; and a control port;

a third inversion valve comprising a delivery port in fluid communication with said supply port of said second inversion valve and said control port of said second inversion valve;

a supply port in fluid communication with a fluid source; and, a control port in fluid communication with said fluid control conduit wherein a decrease in fluid pressure in said fluid control conduit enables delivery of fluid from said fluid source to said parking brake chamber and an increase in fluid pressure in said fluid control conduit enables exhaustion of fluid from said parking brake chamber.

21. The braking system of claim 20 wherein said brake actuator further comprises a spring disposed within said service brake chamber on said first side of said service diaphragm and biasing said service pushrod to a service release position and said parking pushrod to a parking release position.

22. The braking system of claim 20 wherein said brake actuator further comprises:

a parking pushrod extending through said parking diaphragm, said parking pushrod having a first end disposed on said first side of said parking diaphragm and extending into said service brake chamber and disposed on said second side of said service diaphragm, said parking pushrod defining a first plurality of teeth;

a clutch disposed about said parking pushrod and defining a clutch tooth on a radially inner surface configured for intermittent engagement with said first plurality of teeth of said parking pushrod; and a clutch actuator configured to control rotation of said clutch wherein introduction of fluid on said second side of said parking diaphragm urges said parking pushrod away from a parking release position towards a parking apply position and rotation of said clutch moves said clutch tooth into and out of alignment with said first plurality of teeth on said parking pushrod and said clutch tooth has a profile such that, during alignment of said clutch tooth and said first plurality of teeth on said parking pushrod, movement of said parking pushrod is permitted in a first direction along a longitudinal axis of said parking pushrod away from said parking release position and towards said parking apply position and movement of said parking pushrod is inhibited in a second direction along said longitudinal axis opposite said first direction away from said parking apply position and towards said parking release position.

23. The braking system of claim 22 wherein introduction of fluid on said second side of said parking diaphragm and rotation of said clutch occurs simultaneously.

24. The braking system of claim 22 wherein said clutch defines a plurality of ratchet teeth on a radially outer surface and wherein said clutch actuator comprises:

a piston;

a pawl having a first end pivotally supported on said piston and a second end configured for engagement with one of said ratchet teeth on said clutch; and, a spring biasing said second end of said pawl towards said clutch.

25. The brake actuator of claim 24 wherein said clutch defines four ratchet teeth equally circumferentially spaced about said clutch.

26. The braking system of claim 22 wherein said first plurality of teeth on said parking pushrod are arranged in a first longitudinally extending row that extends over a first circumferential portion of an outer surface of said parking pushrod.

27. The braking system of claim 26 wherein said parking pushrod includes a second plurality of teeth arranged in a second longitudinally extending row that extends over a second circumferential portion of said outer surface of said parking pushrod.

28. The braking system of claim 27 wherein a third circumferential portion of said outer surface of said parking pushrod between said first and second circumferential portions is untoothed.

29. The braking system of claim 27 wherein said first and second circumferential portions of said outer surface of said parking pushrod are diametrically opposite one another.

* * * * *